United States Patent
Chen et al.

(10) Patent No.: US 7,099,476 B2
(45) Date of Patent: *Aug. 29, 2006

(54) METHOD FOR UPDATING A NETWORK CIPHERING KEY

(75) Inventors: Kun-Huei Chen, Taipei Hsien (TW); Ju-Nan Chang, Taipei Hsien (TW); Wen-Biao Lee, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 752 days.

This patent is subject to a terminal disclaimer.

(21) Appl. No.: 10/064,045

(22) Filed: Jun. 4, 2002

(65) Prior Publication Data

US 2003/0231772 A1 Dec. 18, 2003

(51) Int. Cl.
*H04L 9/00* (2006.01)
(52) U.S. Cl. .............. 380/277; 380/270; 380/278; 380/282; 380/284; 713/171
(58) Field of Classification Search ........ 380/277–278, 380/282, 171
See application file for complete search history.

(56) References Cited

U.S. PATENT DOCUMENTS

| | | | | |
|---|---|---|---|---|
| 5,661,806 A | * | 8/1997 | Nevoux et al. ............. | 380/247 |
| 6,173,174 B1 | * | 1/2001 | Jacobs ........................ | 455/411 |
| 6,453,159 B1 | * | 9/2002 | Lewis ........................ | 455/411 |
| 6,839,434 B1 | * | 1/2005 | Mizikovsky ................. | 380/247 |
| 6,853,729 B1 | * | 2/2005 | Mizikovsky ................. | 380/249 |
| 2003/0021418 A1 | * | 1/2003 | Arakawa et al. ............ | 380/277 |
| 2003/0099362 A1 | * | 5/2003 | Rollins ....................... | 380/278 |

FOREIGN PATENT DOCUMENTS

| | | | |
|---|---|---|---|
| EP | 1001570 A2 | * | 5/2000 |
| EP | 1073233 A2 | * | 1/2001 |

* cited by examiner

*Primary Examiner*—Gilberto Barron, Jr.
*Assistant Examiner*—Samson Lemma
(74) *Attorney, Agent, or Firm*—Winston Hsu

(57) ABSTRACT

A network system includes a server, an access point connected to the server for transmitting wireless data or receiving wireless data for the server, and a station for receiving wireless data from the access point and transmitting wireless data to the access point. The station has a first key. A ciphering key updating method includes: authenticating the station with the first key; if authentication succeeds, the station transmitting identification data to the access point; and if the identification data matches registration data stored in the server, transmitting a second key to replace or update the first key.

7 Claims, 2 Drawing Sheets

METHOD FOR UPDATING A NETWORK CIPHERING KEY

BACKGROUND OF INVENTION

1. Field of the Invention

The present invention is related to a method for updating a ciphering key used in a network, and more particularly, to a method for updating a ciphering key by way of a wireless network.

2. Description of the Prior Art

A network connects together stations in various locations so that digital data is quickly transmitted between the stations. In this manner, multiple users can share information with each other over the network. With special regard to the development of wireless networks over the recent years, because a physical network transmission line is not required, the ability to connect a station to a wireless network has brought the characteristics of portability and mobility to a user so that the user may access network resources at any place and at any time.

Please refer to FIG. 1. FIG. 1 is a block diagram of a prior art wireless network system 10. The network system 10 complies with IEEE 802.11 specifications. The network system 10 comprises a server S1, a plurality of access points (two representative access points AP1 and AP2 are shown in FIG. 1), and a plurality of stations (four representative stations STA1, STA2, STA3 and STA4 are indicated in FIG. 1). The stations STA1 to STA4 and access points AP1 and AP2 all provide functionality for connecting to the wireless network 10. In other words, each of the stations and access points can send and receive wireless signals so as to transmit data. All transmitted data complies with a unified network protocol. Each of the access points AP1 and AP2 is separately connected to the server S1 so that data can be exchanged between the access point and server S1. Generally, when a station transmits wireless signals (such as radio waves or infrared radiation) with an access point, the effective transmission range is limited. An area R1, marked by a dotted line in FIG. 1, is representative of the area within which the access point AP1 and the stations STA1 and STA2 can effectively exchange wireless signals. Outside the area R1, the wireless signals transmitted from the access point AP1, station STA1 and station STA2 cannot be adequately received. Similarly, an area R2 is representative of the area within which the access point AP2, station STA3 and station STA4 can effectively exchange wireless signals. In order to expand the effective range of the stations in the wireless network 10, the server S1 is used to relay signal transmissions among the access points. For example, because the areaR1 does not overlap the areaR2, the station STA1 cannot effectively exchange wireless data with the station STA4. If the station STA1 wants to exchange data with the station STA4 via wireless transmissions, the station STA1 will first transmit data to the access point AP1 via a wireless transmission, and the server S1 will forward the data to the access point AP2. Finally, the data is wirelessly transmitted to the station STA4. When the station STA4 wants to transmit information to the station STA1, data is transmitted to the station STA1 through the access point AP2, server S1, and access point AP1. In other words, within the effective transmission range of the wireless signals, each of the stations in the wireless network has a corresponding access point, exchanges wireless signals with that access point, and accesses network resources through the access point. As mentioned above, one station can exchange data with another station by using the access point and server to relay the signals. Under this allocation scheme, not only can the wireless functionality of the stations be retained, but the accessing range of the wireless network system 10 is further extended.

Although it is convenient to connect to a wireless network, the security of signal transmissions is a great issue of concern. Unlike the wired signals, which are physically confined by the network transmission line, with wireless signals, within the effective range any wireless receiver can receive the wireless signals. When confidential data is transmitted over a wireless network, it is easy for a third party to eavesdrop and hence steal the confidential data. In order to avoid this situation, wireless signals are encrypted so that a third party cannot read the contents of the signals, even when the third party has illegally intercepted the encrypted signals. This assures the security of data transmission over a wireless network. With regards to FIG. 1, assume that the stations STA1 to STA4 are legal stations in the network 10. In order to ensure that only legal stations can receive wireless signals transmitted in the network 10, the wireless signals transmitted between the legal stations and access points in the network 10 are encrypted by way of a predetermined encryption algorithm and a ciphering key. The legal stations and access points are all provided the functionality to encrypt/decrypt the wireless signals, and therefore a unified ciphering key is stored in each of the legal stations and its corresponding access point. As shown in FIG. 1, a ciphering key Ka is stored in the legal stations STA1 and STA2 and the corresponding access point AP1, and a ciphering key Kb is stored in the legal stations STA3 and STA4 and the corresponding access point AP2. The wireless signals transmitted among the station STA1, STA2 and access point AP1 are encrypted using the ciphering key Ka so that an illegal third party cannot obtain the contents of the wireless signals. After the encrypted wireless signals are received, the station STA1, STA2 and access point AP1 will decrypt the encrypted wireless signals by using the ciphering key Ka to correctly obtain the contents of the wireless signals. Similarly, the access point AP2, and stations STA3 and STA4 encrypt/decrypt the wireless signals by using the ciphering key Kb so as to assure the content security of their network transmissions. The ciphering key Kb may be identical to the ciphering key Ka. With the enciphering/deciphering process, the wireless signals transmitted between the legal stations in the network 10 are incomprehensible to an illegal third party, and thus to achieve the Wired Equivalent Privacy (WEP) of the wireless network. In other words, each of the stations and the corresponding access points under protection of WEP encrypts/decrypts the wireless signals by using a common ciphering key so that an illegal third party cannot read the information carried by the wireless signals.

The network system 10 provides different access services to different stations. However, to provide access services to, and control the accesses of, the legal stations under WEP protection is another issue related to access control, which is not covered by WEP. For example, to prevent the signals transmitted between the legal stations STA1 and STA4 from being stolen by the station STA3, or to ensure that data in the server S1 is accessed only by certain stations, is a type of access control. In order to control access among the legal stations, the server S1 further comprises registration data, such as an address, identification data, confidential ranking, and so on, which correspond exclusively to each of the stations. The identification data comprises a user identification code and a login password. As shown in FIG. 1, an address Add1, user identification code ID1 and login password Pss1 are stored in the server S1, which correspond to the station STA1. Similarly, addresses Add2–Add4, user identification codes ID2–ID4 and login passwords Pss2 to Pss4 respectively correspond to the legal stations STA2 to STA4. The user identification code and login password of each of the legal stations are different from those for the others. The user of a legal station logs into the network system 10 by using an associated user identification code and login password under the protection of WEP. The network system 10 recognizes the identity of each of the stations, and controls access among the legal stations under the protection of WEP so as to provide a specific access service to each of the legal stations. For example, when two of the legal stations exchange data with each other, the signals transmitted between the two stations will include the address of the other station. Even if a third station receives this signal, the third station cannot read this signal because the address is incorrect. As well, the two stations can encrypt their transmitted signals so that only the two stations can read the signals. In addition, after the identity of each of the stations is recognized, the server S1 will determine which network resource can be accessed by a specific station.

In order to achieve the WEP conditions mentioned above, each of the legal stations must share a unified ciphering key. As shown in FIG. 1, a ciphering key Ka is shared by the stations STA1 and STA2 and the access point AP1. In the prior art, the ciphering key is manually input to each of the legal stations via an input device, such as a keyboard, by the station network staff. The ciphering key is required for ensuring WEP, and the ciphering key is automatically used for encryption/decryption when the station is operating. In order to prevent the ciphering key from being leaked by users of the station, it is better to conceal this ciphering key from the users. Therefore, the ciphering key is manually input by the network staff in the prior art. When one station is withdrawn from the access service provided by the wireless network and there are no more a legal stations in the wireless network, in order to assure the WEP compliance of the other legal stations in the wireless network, the ciphering key must be updated so that the station withdrawn from the access service is precluded from illegally reading wireless signals transmitted in the wireless network by using a previously obtained ciphering key. In the prior art, the ciphering key has to be updated manually, which is inefficient and time-consuming. Obviously, the more legal stations present, the more time that must be spent on manually inputting a new ciphering key into each of the stations. Furthermore, the ciphering key may be leaked by the network staff.

SUMMARY OF INVENTION

It is therefore a primary objective of the present invention to provide a method for updating a ciphering key via a wireless network.

In a preferred embodiment, the present invention provides a method for updating a ciphering key used in a network system. The network system comprises a server for storing registration data; an access point connected to the server for transmitting data received from the server via wireless transmission and receiving data transmitted via wireless transmission; and a station for transmitting data to the access point via wireless transmission and receiving data transmitted from the access point via wireless transmission, the station storing a first ciphering key. The method comprises: the access point transmitting a first challenge text to the station via wireless transmission; the station using the first ciphering key stored in the station to encrypt the first challenge text into a first response text; the station transmitting the encrypted first response text back to the access point via wireless transmission; the access point comparing the first response text with a first predetermined text; the station transmitting identification data to the access point when the first response text matches the first predetermined text; the access point transmitting the identification data of the station to the server; and the access point transmitting a second ciphering key to the station to replace the first ciphering key when the identification data matches the registration data.

It is an advantage of the present invention that the security confirmation is repeatedly performed in the updating process so as to assure the ciphering key is not leaked. Additionally, the updating process is automatically performed among the server, access points and stations without the need for manual intervention. This not only makes the updating process more efficiently and rapid, but also ensures that the ciphering key will not be disclosed to the user of the station or to the staff of the network system so as to increase the overall network security.

These and other objectives of the present invention will no doubt become obvious to those of ordinary skill in the art after having read the following detailed description of the preferred embodiment, which is illustrated in the various figures and drawings.

DETAILED DESCRIPTION

Figure 1:
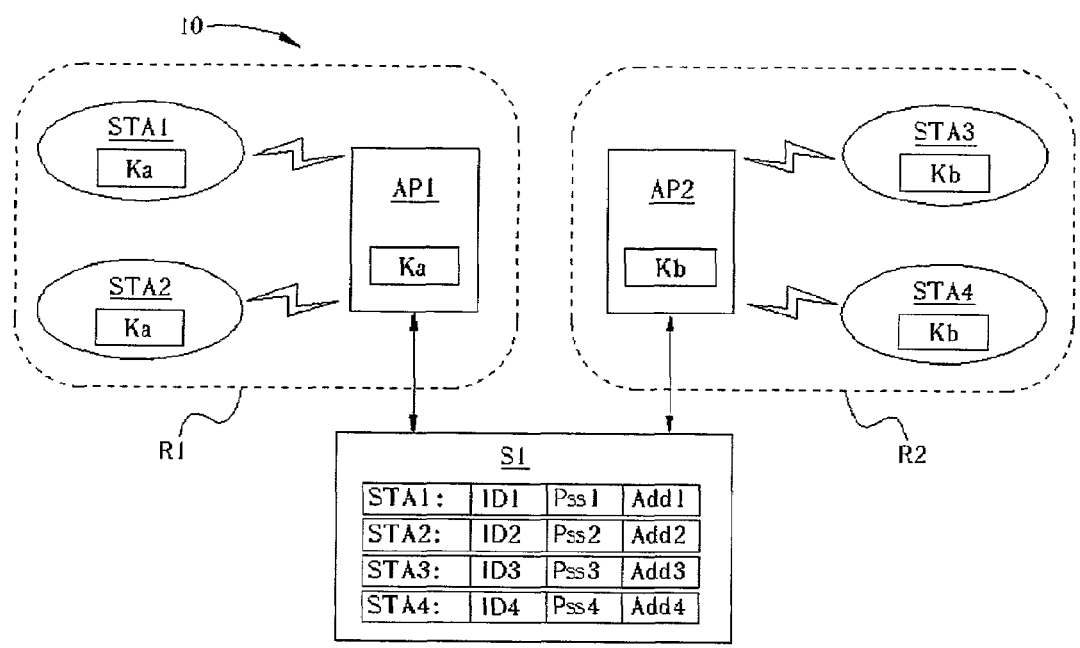
FIG. 1 is a perspective diagram of a prior art wireless network system.

The present invention is provided to update a ciphering key for a wired equivalent privacy (WEP) standard by using the wireless network itself. The ciphering key can be commonly applied to the typical wireless network of FIG. 1. The station can be a personal computer, a notebook computer and so on.

Figure 2:
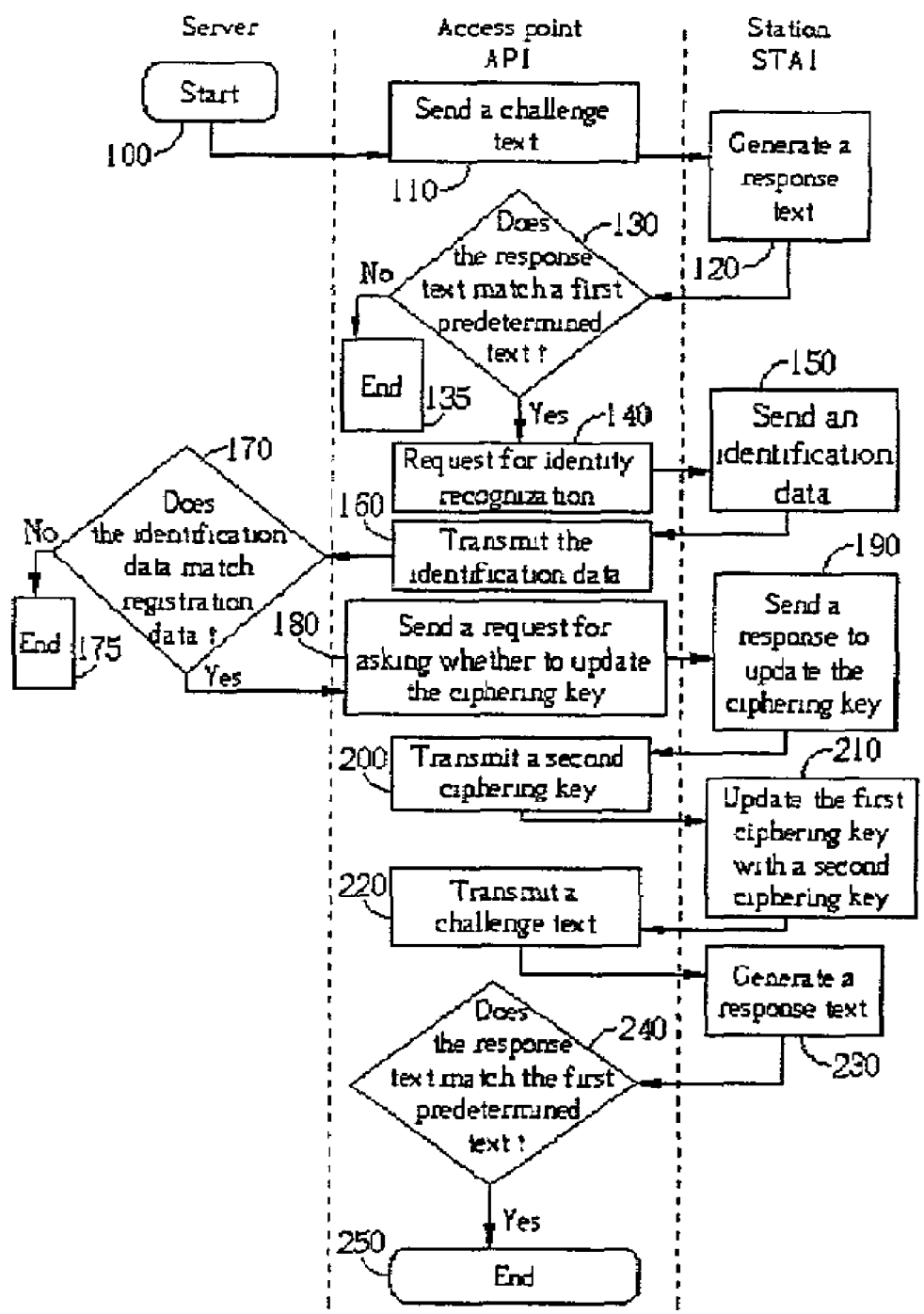
FIG. 2 is a flowchart for illustrating the steps performed when updating a ciphering key of a station according to the present invention.

Please refer to FIG. 2. FIG. 2 is a flowchart for illustrating the steps performed when updating a ciphering key of a station according to the present invention. The three columns in FIG. 2, from the left to the right, are respectively representative of the steps performed by a server, an access point, and a station. In the following, for the sake of example it is assumed that the ciphering key to be updated is the ciphering key for the station STA1 of FIG. 1 (the corresponding access point is AP1), and further assumed that a first ciphering key is originally stored in the station STA1, and that the first ciphering key is to be replaced by a second ciphering key so as to perform the updating of the wired equivalent privacy (WEP) protocol. Assuming an appropriate transmission range for wireless signals, the access point and station transmit signals to each other in a wireless manner.

The steps performed by the present invention are described as follows.

Step 100: Begin updating of the ciphering key for the wired equivalent privacy (WEP) standard.

Step 110: the access point AP1 sends out a challenge text to station STA1 via wireless transmission. At this time, the access point AP1 encrypts this challenge text into a first predetermined text by using the first ciphering key. The access point AP1 does not confirm if the station STA1 is a protection subject of WEP. Before WEP is established, this challenge text can be transmitted to the station STA1 without being encrypted.

Step 120: after the station STA1 receives the challenge text, it will encrypt the challenge text into a response text by using the first ciphering key, and transmit the response text to the access point AP1 via wireless transmission.

Step 130: after the access point AP1 receives the response text, it will compare the response text transmitted from the station STA1 with the first predetermined text obtained in step 110, and check if the two match each other. If so, then proceed to step 140; if not, then go to step 135.

Step 135: if the response text generated by the station STA1 does not match the first predetermined text of the access point AP1, then the first ciphering key in the station STA1 is different from the first ciphering key in the access point AP1, and the station is thus not a legal station under the protection of WEP. Therefore, no subsequent steps need to be performed.

Step 140: if the response text of the station STA1 matches the first predetermined text of the access point AP1, then the first ciphering key of the station STA1 is identical to the first ciphering key in the access point AP1, and the access point AP1 transmits wireless signals with the station STA1 under the protection of WEP. From steps 110, 120, 130 to this step, the station STA1 has been certified as a subject protected by WEP. By using the first ciphering key, the transmission between the station STA1 and access point AP1 is under the protection of WEP. In order to continuously update the first ciphering key, the access point AP1 must send a request to the station STA1 to recognize the identity of the station STA1.

Step 150: after the request of the access point AP1 is received, the user of the station STA1 can send identification data to the access point AP1 via wireless transmission by using the station STA1. As mentioned previously, the identification data comprises a user identification code and a login password.

Step 160: after the access point AP1 receives the identification data transmitted from the station STA1, the access point AP1 will transmit the identification data to the server.

Step 170: after the server receives the identification data transmitted form the station STA1 via the access point AP1, the server will compare the identification data with identification data in a registration database stored on the server so as to verify the identity of the station STA1. If the identification data matches the associated registration data in the registration database, then proceed to step 180. If the identification data does not match the registration data, then go to step 175.

Step 175: If the identification data form the station STA1 does not match the registration data in the server, then the station STA1 should not be given access the network system. The reason for this is that the station STA1 was originally provided an access service of wireless network, but this access service was withdrawn by the wireless network before step 100 was performed. Therefore, the server has removed the associated registration data from the registration database. Because the first ciphering key is still stored in the station STA1, the station STA1 can enter into the wireless network by way of wired equivalent privacy (WEP) to perform the steps up to this current step 175. The present invention is provided to update the WEP ciphering key so as to prevent stations like this from obtaining the protection range of WEP from the network system. Hence, if the station STA1 has been withdrawn from an access service of the wireless network, there is no need to update the ciphering key of the station STA1. Therefore, subsequent steps need not be performed.

Step 180: If the identification data of the station STA1 matches the registration data in the server, then the station STA1 is a subject of an access service provided by the wireless network, and the first ciphering key of the station STA1 must be updated so that the station STA1 can continue to use the access service of the network under the protection of the updated WEP protocol. At this time, the access point AP1 can further send out a request to ask the user of the station STA1 if he or she wants to update the WEP ciphering key.

Step 190: the station STA1 responds to the request of the access point AP1. If the response indicates updating of the ciphering key, the response is transmitted to the access point AP1. If the response indicates no updating of the ciphering key, the station STA1 will lose the WEP protection range after the ciphering key is updated.

Step 200: after receiving the response to update the ciphering key from the station STA1, the access point AP1 transmits a second ciphering key to update the ciphering key of the station STA1. As previously mentioned, the access service provided by the network system can designate a corresponding address and transmit the second ciphering key to the station STA1. In addition, when encrypting the second ciphering key by way of the first WEP ciphering key, the second WEP ciphering key may also be encrypted by using data belonging exclusively to the station STA1 (for example, the login password in the identification data or other registration) so as to ascertain that in each station under the protection of WEP, only the station STA1 can correctly decrypt the second ciphering key. At the time of transmitting the second ciphering key, the related instructions for updating can also be transmitted so as to control the station STA1 to update the first ciphering key to the second ciphering key. Simultaneously, the access point AP1 can provide notice to the station STA1 of the encrypting algorithm used for encrypting the second ciphering key so that the station STA1 can accurately obtain the second ciphering key.

Step 210: after the station STA1 obtains the second ciphering key, the first ciphering key can be replaced with the second ciphering key so that subsequent protection of the updated WEP protocol can be performed.

Step 220: in order to verify that the correct second ciphering key has been provided to and updated in the station STA1, a confirmation process between the access point AP1 and the station STA1 can be performed. The access point AP1 can generate a challenge text and transmit it to the station STA1. Under situations in which the WEP protocol is not confirmed as operational, this challenge text can be transmitted to the station STA1 without being encrypted. At the same time, the access point AP1 will encrypt this challenge text into a corresponding second predetermined text by using the second ciphering key.

Step 230: the station STA1 encrypts the challenge text transmitted from the access point AP1 into a response text by using the second ciphering key, and transmits the response text to the access point AP1.

Step 240: the access point AP1 checks if the response text of the station STA1 matches the second predetermined text generated in step 220. If so, then the stationAP1 has correctly updated the WEP ciphering key to the second ciphering key, and WEP can be established between the station STA1 and the access point AP1 by using the second ciphering key.

Step 250: the process of updating the ciphering key ends. Through the steps 220, 230, 240 and this step, the access point AP1 has been able to recognize the station STA1 as a protection subject of the updated WEP protocol. WEP protection can be applied continuously between the station STA1 and the access point AP1 by using the second ciphering key. In other words, the wireless signals transmitted between the access point AP1 and the station STA1 will be encrypted by way of the second ciphering key.

According the described flowchart of the present invention, the present invention is provided to update the WEP ciphering key via a wireless network system so as to update the WEP protocol. Because all legal stations in the wireless network system are within the protection range of WEP, each of the legal stations becomes a protection subject of the WEP protocol by using a unified ciphering key. In the prior art, when the WEP ciphering key is updated, each of the legal stations has to be manually reset. This not only wastes time, which is contrary to the convenience principles of the network, but also makes leaks of the ciphering keys easy, threatening the overall security of the wireless network system. Compared to the prior art, the present invention is provided to update the WEP ciphering key by utilizing the wireless network system. The security confirmation is repeatedly performed in the updating process so as to assure that the ciphering key is not leaked. Additionally, the updating process is automatically performed between the server, access points and stations without the need for manual intervention. This not only makes the updating process more efficient and quick, but also ensures that the ciphering key is not disclosed to the user of a station or to the staff of the network system, thus increasing the overall network security.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for updating a ciphering key used in a network system, the network system comprising:
    a server for storing registration data;
    an access point connected to the server for transmitting data received from the server via wireless transmission and receiving data transmitted via wireless transmission; and
    a station for transmitting data to the access point via wireless transmission and receiving data transmitted from the access point via wireless transmission, the station storing a first ciphering key;
    the method comprising:
    the access point transmitting a first challenge text to the station via wireless transmission;
    the station using the first ciphering key stored in the station to encrypt the first challenge text into a first response text;
    the station transmitting the encrypted first response text back to the access point via wireless transmission;
    the access point comparing the first response text with a first predetermined text;
    the station transmitting identification data to the access point when the first response text matches the first predetermined text;
    the access point transmitting the identification data of the station to the server; and
    the access point transmitting a second ciphering key to the station for replacing the first ciphering key when the identification data matches the registration data, wherein the second ciphering key is encrypted by the first ciphering key before being transmitted to the station.

2. The method of claim 1 wherein the station uses the second ciphering key to encrypt the data transmitted to the access point and to decrypt the data received from the access point after the first ciphering key is replaced by the second ciphering key.

3. The method of claim 1 wherein the station uses the second ciphering key to encrypt the data transmitted to the station after the access point transmits the second ciphering key to the station.

4. The method of claim 1 wherein the first predetermined text is generated from encrypting the challenge text by the first ciphering key.

5. The method of claim 1 further comprising requesting a response from a user of the station before replacing the first ciphering key by the second ciphering key.

6. The method of claim 1 wherein the network comprises a plurality of stations, and each station comprises the first ciphering key.

7. The method of claim 1 wherein further comprising:
    the access point transmitting a second challenge text to the station via wireless transmission after the second ciphering key is transmitted to the station;
    using the second ciphering key stored in the station to encrypt the second challenge text into a second response text;
    transmitting the second response text back to the access point via wireless transmission; and
    the access point comparing the second response text with a second predetermined text.

* * * * *